3,064,255
Patented Nov. 13, 1962

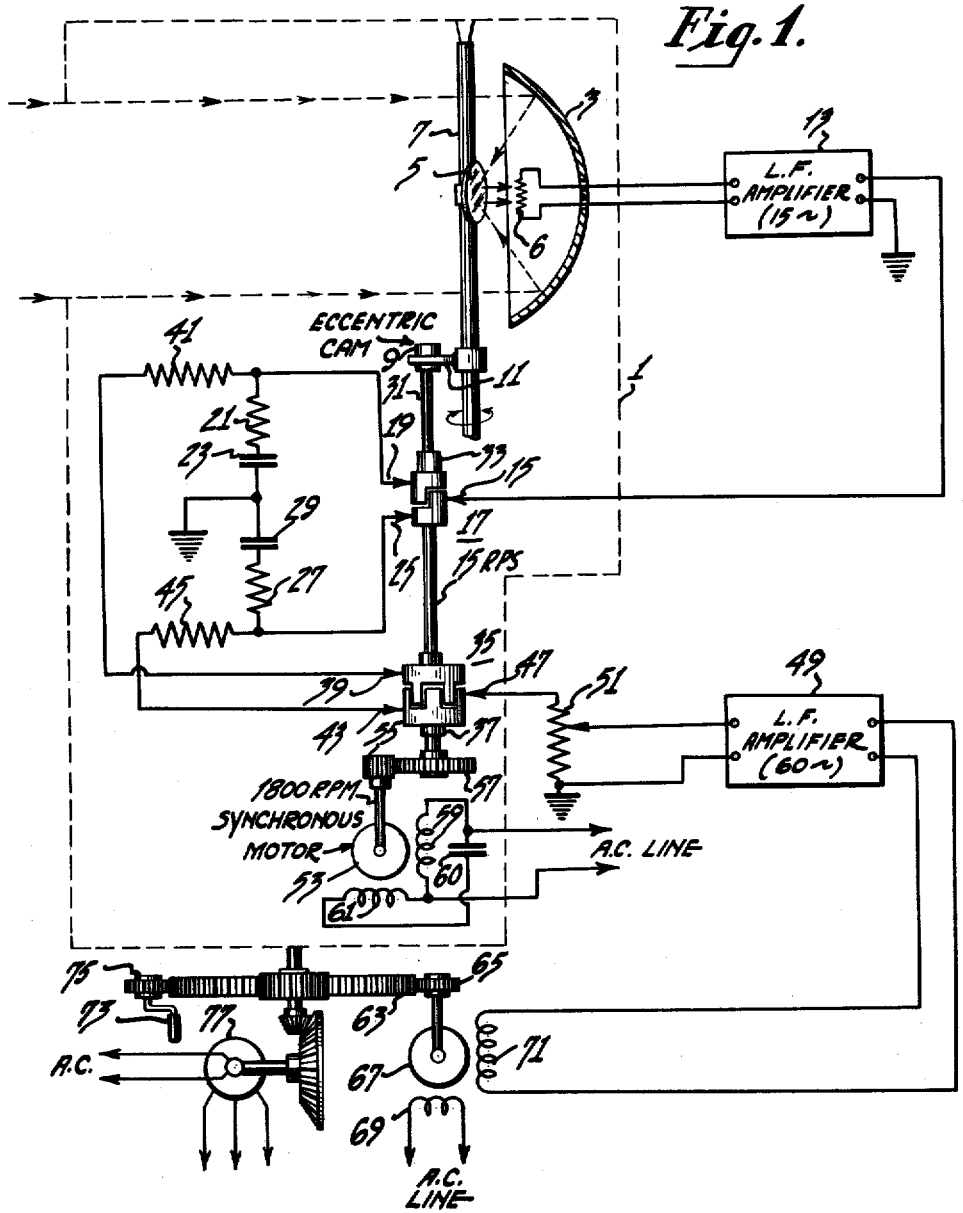

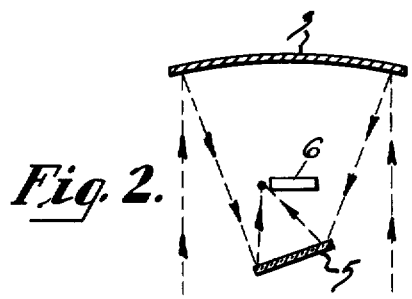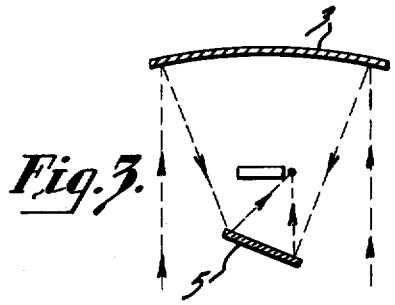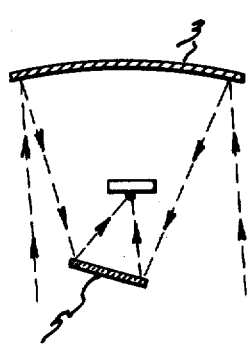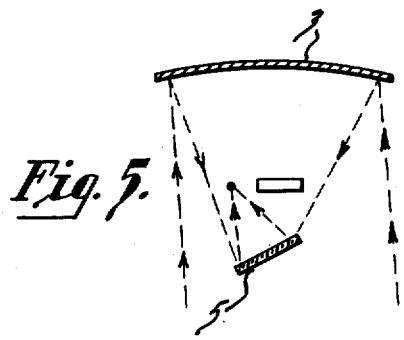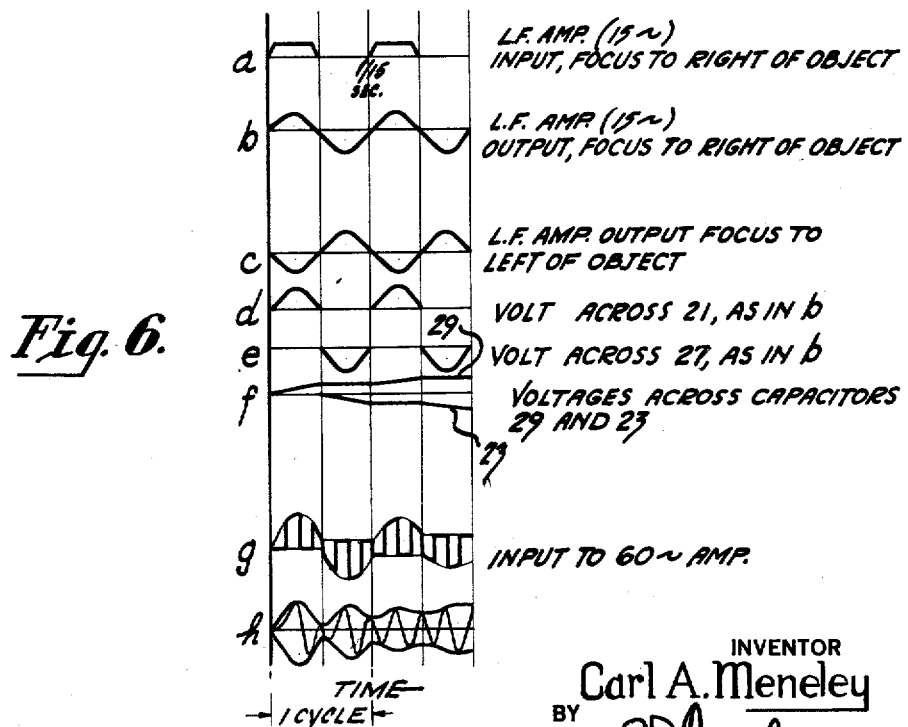

3,064,255
RADIANT ENERGY FOLLOWER SYSTEM
Carl A. Meneley, Princeton, N.J., assignor, by mesne assignments, to the United States of America as represented by the Secretary of the Navy
Filed Dec. 11, 1945, Ser. No. 634,365
14 Claims. (Cl. 343—117)

This invention relates to follower systems and in particular to a sensitive device for automatically tracking a moving object by means of a servo mechanism responsive to radiant energy emanating from the object.

Systems are known in which the radiant energy from an object, such as an airplane, ship or other moving vehicle, is received by a device which responds to this energy and produces a local indication from which the position of the object may be determined. The present invention is a device for automatically following such an object, which, through a suitable servo mechanism, causes a gun, searchlight or other device to be trained on the object at all times. Specifically, the present invention may be used in conjunction with a modulated light beam signalling system between ships at sea which must be focussed on the vessel with which communication is being held so as to compensate for the relative movement of the two vessels.

Accordingly, it is the primary object of this invention to provide an improved follower system responsive to radiant heat or infra-red energy radiated by a moving object.

A further object of this invention is to provide a simplified circuit for controlling a servo mechanism in the operation of a follower system.

A still further object of this invention is to provide a simplified control circuit for servo mechanisms which maintains its adjustment indefinitely and in which the tendency to "hunt" is reduced to a minimum.

Other objects of this invention and a more complete understanding of its operation will be obtained from a consideration of the drawings, in which FIGURE 1 is a schematic diagram illustrating a system in accordance with applicant's invention;

FIGURES 2 through 5 inclusive are illustrations of the operation of the mechanical scanning system, and FIGURE 6 is an illustration of the time relation of various voltages and currents produced in different portions of the system.

Referring to FIG. 1, the follower mechanism, or such components thereof as may be desired, are mounted for rotation about a vertical axis in a mounting structure indicated by the dotted lines 1. For directionally collecting and focussing the radiant energy a spherical or parabolic reflector 3 is provided. A secondary reflector 5 is mounted in front of the principal focus of the reflector 3 in such a manner that the incoming rays are brought to a focus on the surface of a heat-sensitive element 6 which may be any of the well known types of infra-red sensitive devices, or preferably a heat detection device of the type described and claimed in copending application of John Evans, Serial No. 478,969, filed March 12, 1943, now Patent 2,437,085 issued March 2, 1948. The secondary or auxiliary reflector 5 is mounted on a vertical shaft 7 which may be oscillated back and forth through a small angle by means of an eccentric cam 9 and follower 11 mechanism.

The output of the heat sensitive device 6 is connected to the input of a low frequency amplifier 13, preferably tuned to select impulses of the frequency of oscillation of auxiliary reflector 5 which in the present case is 15 cycles per second. The output of amplifier 13 is connected to ground and to one contact 15 of a commutator 17 which is equivalent to a single pole double throw switch. One output terminal 19 of the commutator is connected to ground through a first integrating network comprising resistor 21 and capacitor 23, and the other output 25 is connected to ground through a second integrating network comprising resistor 27 and capacitor 29. Commutator 17 is mounted on a shaft 31 and held in position by a collar and set screw 33. Cam 9, which is a conventional eccentric cam, is also mounted on shaft 31. On the same shaft 31 there is provided a second commutator 35 which is also the equivalent of a single pole double throw switch, but having four times as many segments as has commutator 17. It is also mounted on shaft 31 by means of a collar and set screw 37. The output of the first integrating network is connected to a contact 39 through a coupling resistor 41, and the output of the second integrating network is connected to contact 43 through coupling resistor 45. Contacts 39 and 43 make contact with the two rings of the armature. The third contact 47 takes the output from the second commutator and applies it to a low frequency amplifier 49, preferably tuned to resonance at the output frequency of commutator 35, which in the present case, is 60 cycles per second. An input potentiometer 51 may be included in this circuit as a convenient means of adjusting the amplitude of the input voltage to the amplifier.

Shaft 31 together with the attached cam and commutators is rotated by a synchronous motor 53 through a two-to-one reduction gear drive 55, 57. The induction motor rotates at a speed of 1800 r.p.m. which drives shaft 31 at 900 r.p.m., which is equivalent to an angular velocity of 15 revolutions per second. Motor 53 is provided with the conventional field windings 59 and 61 which are energized from a standard source of 60 cycle current not shown, and a phasing capacitor 60.

The mounting structure 1 is adapted to be rotated about a vertical axis by means of a gear 63 driven through a small gear 65 by an induction motor 67 having two field windings 69 and 71. One of these windings, 69 for example, is energized from the same source of 60 cycle A.C. while the other winding 71 is connected to the output of low frequency amplifier 49. Gear 63 is also coupled to a hand crank 73 by means of a small gear 75 in order to permit manual rotation of the device to search the horizon to bring the objective within the range of the directionally receptive indicating mechanism. A synchronous transformer 77 may also be coupled to gear 63 to provide output voltages which may actuate a remote indication device, not shown, to show the position of the follower at all times. In addition, or alternatively, the voltages derived from synchronous transformer 77 may be utilized in the conventional manner to control the corresponding movement of a modulated light beam or other device whose angular position is to be controlled.

The operation and adjustment of the auxiliary reflector is best seen by referring to FIGS. 2 through 5. In FIG. 2 the top view of the reflector 3 and heat sensitive element 6 is shown, with the reflecting mirror 5 in the position of extreme counterclockwise motion. The angle of rotation of the reflector 5 is adjusted so that the point of focus of the received energy arriving from a direction parallel to the axis of reflector 3, as indicated by the dotted lines, lies just beyond the limits of the sensitive surface of the heat sensitive device 6. Similarly, as shown in FIG. 3, the point of focus lies just beyond the limits of the heat sensitive device when the reflecting mirror 5 reaches its maximum deflection in a clockwise direction. It is therefore evident that when heat or infra-red rays originating from a source which lies on the focal axis of the reflector are received, the output of the heat sensitive element 6 will be substantially constant, but will have a small variation occurring twice during each cycle of oscillation which produces a 30 cycle component in the output. However, assuming the follower is positioned so that energy is received, but the source does not lie on the focal axis of the reflector, as shown in FIG. 4, it will be seen that the auxiliary reflector 5 focusses the energy on the heat sensitive surface 6 during only that portion of the time during which the mirror is rotated in one direction or the other. Thus if the angle of the approach is as illustrated in FIG. 4, the focus point of the energy will fall approximately at the center of the heat sensitive device 6 when the vibrating mirror 5 is in its maximum clockwise rotation. When the mirror rotates to its counterclockwise direction, however, the point of focus does not fall on the heat sensitive element, as shown in FIG. 5.

As a result of the arrangement described, the output voltage of the heat sensitive device will vary as shown in FIG. 6a when the received energy is not on the focal axis of the system, for example, when the device is looking at an area to the right of the objective as shown in FIGS. 4 and 5. During the clockwise or right-hand deflection of the reflecting mirror, corresponding to the first half cycle of operation, an output pulse will be produced, and during the second half cycle of counterclockwise or left-hand deflection of the mirror, no pulse will be produced, since the point of focus does not lie on the heat sensitive surface. Since the cam 9 is rotating at a rate of 15 revolutions per second, a complete cycle will be completed in a 15th of a second and the duration of the pulses will be approximately a half cycle, and one such pulse will be produced during each complete cycle.

If the follower is looking at an area to the left of the objective, it will be seen that the point of focus will lie on the sensitive area during the second half of each cycle, that is, when the reflecting mirror is executing its counterclockwise movement.

FIG. 6b illustrates the voltage output produced by the low frequency amplifier 13 when the device is looking to the right of the objective. Due to the frequency discrimination of the 15 cycle amplifier, which eliminates the higher frequency components, the input pulses will be transformed into a substantially sine wave voltage output having positive peaks in the first half-cycle and negative peaks in the second half cycle. For the reasons discussed above, the phase of the output voltage will change 180 degrees when the follower moves from a position from the right of the object to a position to the left of the object. A sense indication is thus produced through the phase reversal of the output voltage. The voltage of opposite phase is illustrated in FIG. 6c of the drawings.

Commutator 17 is adjusted on shaft 31 so that pulses from the low frequency amplifier in the first half cycle are applied to the first integrating network and pulses of the second half cycle are applied to the second integrating network. Thus the voltage across resistor 21 is as shown in FIG. 6d and the voltage across resistor 27 is as shown in FIG. 6e, assuming the follower is looking to the right of the objective. The successive pulses charge capacitors 23 and 29 as shown in FIG. 6f. The output of the integrating networks is therefore a composite voltage proportional to the output of the low frequency amplifier 13 and the accumulated charge on the capacitors. These voltages are alternately applied to the input of the low frequency amplifier 49 at a 60 cycle rate, and the input voltage to this amplifier is as illustrated in FIG. 6g.

The particular advantages of on integrating network in a servo mechanism of this type are fully described and claimed in a co-pending application of A. V. Bedford, Serial No. 485,037, filed April 29, 1943, now Patent 2,439,198 issued April 6, 1948. Such a circuit has a particular advantage in cases where the rate of change of the control voltage is low. Low speed of operation is necessary when heat sensitive devices are utilized because of the inherent time delay of such devices. By combining with the direct control voltage, which is the output of amplifier 13, an integrated voltage proportional to the total control voltages for a considerable period of time, a reduction in "hunting" is effected, and accuracy and sensitivity of the system is greatly increased.

The output of amplifier 49 is a modulated sine wave voltage as shown in FIG. 6h. The envelope corresponds to the 15 cycle rate of interruption produced by the oscillation of auxiliary reflector 5 and the high frequency component is the 60 cycle voltage produced by the interrupter or commutator 35. This voltage is applied to winding 71 of the induction motor. By suitable adjustment of the position of the cam 9 with respect to the shaft 31, the phase of the output voltage from amplifier 49 is made to have a quadrature relation to the line voltage applied to winding 69. It is adjusted lagging or leading so as to produce rotation of motor 67 in such a direction that the follower mechanism is rotated towards the object. From the discussion above, it will be seen that the device will tend to turn itself toward the object as soon as sufficient energy is picked up to produce output voltage in the system sufficient to operate motor 67, and will thereafter tend to follow the object as it moves or as the angle between the object and the follower varies as a result of the motion of either one. The quadrature phasal relationship is not disturbed by changes in the phase of the line voltage, since this will correspondingly affect the position of the rotor of synchronous motor 53 which automatically adjusts for such change through a small, angular rotation of the shaft 31. Once having been adjusted, the system continues to operate without further trouble, since the entire system is mechanical and the adjustments remain fixed.

During the off-target condition the output of the radiation sensitive element 6 includes a fundamental 15 cycle component, which the amplifier 13 selects and converts into a 15 cycle sine wave which will be modulated by the commutator 35, thus feeding a 60 cycle signal having a 15 cycle envelope into the amplifier 49. The amplifier 49 selects the 60 cycle modulation component and feeds it in predetermined phase relation to the field winding 71 of the reversible motor. During the on-target condition the energy output of the radiation sensitive element 6 will include a fundamental 30 cycle component, which will be fed through the amplifier 13 without appreciable amplification, but which will be converted by the particular arrangement of the commutators 17 and 35, and the reflector 5, all synchronized in motion, into a modulated signal of 60 cycles having a 30 cycle envelope. Therefore, even in the on-target condition, the amplifier 49 will be supplied by signals of different amplitude from that obtaining in the off-target condition. These signals will contain a 60 cycle component, which the amplifier 49 will selectively amplify and apply to the field winding 71 of the reversible motor.

It should be noted that as the follower picks up a signal and begins to rotate towards the object radiating the energy, the 15 cycle input to amplifier 13 decreases in amplitude and is reduced to a small 30 cycle current when the follower is exactly on the target. This reduction of the amplitude of the motor control current as the target is approached is useful in reducing the tendency to hunt, since the driving force is reduced in proportion to the angle of error, and the tendency to overshoot the correct position is correspondingly reduced. If the objective is moving rapidly and the system tends to fall behind in its attempt to follow it, the component of the control voltage resulting from the integrating networks increases, thus increasing the torque applied by the driving motor 67 to reduce the error.

The 30 cycle current mentioned above occurs when the device is "on center" by reason of the slight overshooting of the focus point with respect to the heat sensitive surface. This current has a very desirable effect in that it makes the motor 67 oscillate back and forth when the system is at rest and thus overcomes the static friction of the system. This, in effect, increases the sensitivity of the system, since the 60 cycle driving current resulting from an "off position" condition does not have to overcome initial static friction, and the system is ready to respond to a control current. The 30 cycle current does not cause "hunting" because the inertia of the motor prevents rotation of any magnitude.

What I claim for my invention is:

1. A device of the character described comprising energy responsive means adapted to convert radiant energy to electrical currents, means for directionally collecting and focussing radiant energy on said energy responsive means, means for modulating said energy to produce an A.C. current whose amplitude and phase are dependent upon the bearing of the source of said radiant energy with respect to said device, means synchronized with said modulating means for deriving from said A.C. current positive and negative components, respectively, an amplifier, commutator means for causing said positive and negative components to be applied alternately to the input of said amplifier and a reversible motor for rotating said device connected to the output of said amplifier.

2. A device of the character described including, in combination, a directional reflector mounted for rotation so as to scan successive areas, a radiant energy sensitive device, an auxiliary reflector associated with said directional reflector for focussing said radiant energy on said sensitive device, means for imparting oscillatory motion to said auxiliary reflector, an amplifier having its input connected to said sensitive device, a commutator synchronized with the movement of said auxiliary reflector for deriving from the output of said amplifier positive and negative components, respectively, a second amplifier, means for causing said positive and negative components to be applied alternately to the input of said second amplifier, an induction motor having two field windings, one of said windings being actuated by a fixed source of power, the other of said windings being energized by the output of said second amplifier, means for establishing a 90° phasal relation between currents in said windings, said motor being adapted to rotate said device when energized by said currents.

3. A device of the character described in claim 1 in which said commutator applies said components to said amplifier at the rate of sixty cycles per second.

4. A device of the character described in claim 1 in which said means for modulating said energy comprises a rotatably oscillatory reflector in the focus path of said means for directionally collecting and focussing radiant energy.

5. A device of the character described in claim 2 in which the oscillatory motion of said auxiliary reflector occurs at a 15 cycle rate, said means for causing positive and negative components to be applied alternately to the input of said second amplifier operates at a sixty cycle rate, and said fixed source of power has a frequency of sixty cycles.

6. A device of the character described in claim 2 which includes a synchronous motor for actuating said auxiliary reflector, said commutator and said means for causing said positive and negative components to be applied alternately to the input of said second amplifier.

7. A device of the character described including in combination, a radiant energy sensitive device, a directional reflector mounted for rotation about a vertical axis, an auxiliary reflector associated with said directional reflector for causing radiant energy collected by said directional reflector to impinge on said sensitive device, means for imparting limited oscillatory motion about a vertical axis to said auxiliary reflector to cause energy arriving in paths substantially parallel to the directional axis of said reflector to trace a path lying on the sensitive surface of said sensitive device, two integrating networks, means including a first commutator for coupling said sensitive device to said networks alternately in synchronism with the oscillatory motion of said auxiliary reflector, an induction motor for rotating said directional reflector when energized, and means including a second commutator coupling said integrating networks to said motor.

8. A device of the character described in claim 7 in which said first commutator couples said sensitive device to one of said integrating networks during displacement of said auxiliary reflector in one direction and to the other integrating network during displacement of said reflector in the other direction.

9. A device of the character described in claim 7 in which said commutators are mechanically coupled, said second commutator having four times as many segments as said first commutator.

10. A device of the character described in claim 7 including a synchronous motor, and in which said commutators are mechanically coupled to each other and driven at constant speed by said synchronous motor, and a cam mechanism operated by said motor for oscillating said auxiliary reflector.

11. A device of the character described in claim 7 in which said means including a first commutator includes an amplifier tuned to pass 15 cycles alternating currents and said means including a second commutator includes an amplifier tuned to pass 60 cycle alternating currents.

12. A device of the character described including in combination a radiant energy sensitive device, a directional reflector mounted for rotation about a vertical axis, an auxiliary reflector associated with said directional reflector for causing radiant energy collected by said directional reflector to impinge on said sensitive device, means for imparting limited oscillatory motion about a vertical axis to said auxiliary reflector to cause energy arriving in paths substantially parallel to the directional axis of said reflector to trace a path lying on the sensitive surface of said sensitive device, two integrating networks, means including a 15 cycle resonant amplifier and a first commutator for coupling said sensitive device to said networks alternately at a 15 cycle rate, an induction motor having a pair of field windings, one of said windings being energized from a source of A.C. power, a 60 cycle tuned amplifier having its output coupled to the other of said field windings, a commutator for coupling said integrating networks alternately at a 60 cycle rate to the input of said 60 cycle amplifier, said motor being adapted to rotate said directional reflector, and means for synchronizing the oscillatory motion of said auxiliary reflector with the operation of said commutators.

13. A device of the character described in claim 1 including means coacting with said modulating means for reducing static friction in said reversible motor.

14. A device of the character described in claim 7 in which said means for imparting oscillatory motion to said auxiliary reflector causes energy arriving in paths substantially parallel to the directional axis of said directional reflector to trace a path lying on and extending beyond the sensitive surface of said sensitive device.

References Cited in the file of this patent

UNITED STATES PATENTS

| | | |
|---|---|---|
| 1,931,980 | Clavier | Oct. 24, 1933 |
| 2,138,966 | Hafner | Dec. 6, 1938 |
| 2,153,782 | Weber | Apr. 11, 1939 |
| 2,257,757 | Moseley | Oct. 7, 1941 |
| 2,412,612 | Godet | Dec. 17, 1946 |
| 2,414,430 | Nisbet | Jan. 14, 1947 |
| 2,417,248 | Godet | Mar. 11, 1947 |